US010191262B2

(12) United States Patent
Bustin (10) Patent No.: US 10,191,262 B2
(45) Date of Patent: Jan. 29, 2019

(54) WAVEGUIDE FOR MULTISPECTRAL FUSION

(71) Applicant: Qioptiq Limited, St. Asaph (GB)

(72) Inventor: Nicholas Karl Bustin, Hankelow (GB)

(73) Assignee: Qioptiq Limited, St. Asaph (GB)

( * ) Notice: Subject to any disclaimer, the term of this patent is extended or adjusted under 35 U.S.C. 154(b) by 226 days.

(21) Appl. No.: 15/133,691

(22) Filed: Apr. 20, 2016

(65) Prior Publication Data

US 2016/0313544 A1 Oct. 27, 2016

(30) Foreign Application Priority Data

Apr. 24, 2015 (GB) .................... 1506986.7

(51) Int. Cl.
| | | |
|---|---|---|
| *G02B 17/08* | (2006.01) | |
| *F21V 8/00* | (2006.01) | |
| *G02B 27/10* | (2006.01) | |
| *G02B 17/00* | (2006.01) | |
| *G02B 23/04* | (2006.01) | |
| *H04N 5/225* | (2006.01) | |
| *H04N 5/33* | (2006.01) | |

(52) U.S. Cl.
CPC ....... *G02B 17/0896* (2013.01); *G02B 6/0035* (2013.01); *G02B 17/008* (2013.01); *G02B 23/04* (2013.01); *G02B 27/1006* (2013.01); *G02B 27/1013* (2013.01); *H04N 5/2258* (2013.01); *H04N 5/332* (2013.01)

(58) Field of Classification Search
CPC ... G02B 6/0035; G02B 27/1013; H04N 5/332
USPC ....................................................... 348/164
See application file for complete search history.

(56) References Cited

U.S. PATENT DOCUMENTS

| | | | |
|---|---|---|---|
| 5,548,671 | A | 8/1996 | Wu et al. |
| 5,812,262 | A | 9/1998 | Ridyard et al. |
| 5,910,816 | A | 6/1999 | Fontenot |
| 2003/0067538 | A1 | 4/2003 | Myers |
| 2005/0083525 | A1 | 4/2005 | Peupelmann et al. |
| 2009/0050806 | A1 | 2/2009 | Schmidt |
| 2013/0271731 | A1 | 10/2013 | Popovich et al. |

FOREIGN PATENT DOCUMENTS

| | | |
|---|---|---|
| EP | 2631619 | 8/2013 |
| EP | 2857885 A1 | 4/2015 |
| WO | 01/06280 | 1/2001 |

OTHER PUBLICATIONS

Combined Search and Examination Report for GB1506986.7, dated Oct. 16, 2015.
European Search Report for EP16166376.0, dated Sep. 14, 2016.

*Primary Examiner* — Nguyen T Truong
(74) *Attorney, Agent, or Firm* — Peter A. Nieves; Sheehan Phinney Bass & Green PA (57) ABSTRACT

A system includes an optical waveguide configured to receive multispectral radiation from a scene, a first optical component and a second optical component. The first optical component is configured to cause a first portion of the multispectral radiation with wavelengths in a first range to exit the optical waveguide at a first position, and a second portion of the multispectral radiation with wavelengths in a second range to travel through the optical waveguide from the first position to a second position via total internal reflection. The second optical component is configured to cause the second portion of the multispectral radiation to exit the optical waveguide at the second position.

20 Claims, 3 Drawing Sheets

FIG. 3

WAVEGUIDE FOR MULTISPECTRAL FUSION

CROSS-REFERENCE TO RELATED APPLICATION

This application claims priority to copending UK Application entitled "Waveguide for Multispectral Fusion," having serial no. 1506986.7, filed Apr. 24, 2015, which is entirely incorporated herein by reference.

FIELD OF THE INVENTION

This disclosure relates to a waveguide and, more particularly, a waveguide design that is useful in connection with multispectral fusion and other applications.

BACKGROUND

In general, multispectral fusion can refer to combining two or more different types of image data from a scene to produce a single image of the scene. Certain weapon sights, for example, utilize multispectral fusion to fuse together visible image data and thermal image data from a scene to produce a composite image that includes both a visible component and a thermal component. The scene could be anything, such as battlefield, a forest, a shooting range, etc.

Image accuracy in some such systems can suffer from a phenomenon known as parallax, which can occur, for example, when radiation from a particular element (e.g., a target) in a scene enters two or more input apertures of a weapon sight from different angles. In some instances, this can result in an offset between the visible and thermal components, for example, in the resulting composite image. This offset can vary depending on the distance between the target and each input aperture and can have a meaningful impact on accuracy and usefulness of the composite image, particularly in applications such as weapon sights or the like.

SUMMARY OF THE INVENTION

In one aspect, a system includes an optical waveguide configured to receive multispectral radiation from a scene, a first optical component and a second optical component. The first optical component is configured to cause a first portion of the multispectral radiation with wavelengths in a first range to exit the optical waveguide at a first position, and a second portion of the multispectral radiation with wavelengths in a second range to travel through the optical waveguide from the first position to a second position via total internal reflection. The second optical component is configured to cause the second portion of the multispectral radiation to exit the optical waveguide at the second position.

In a typical implementation, the multispectral radiation passes through one and only one input aperture to reach the optical waveguide.

In another aspect, a system includes an optical waveguide, one and only one input aperture for the optical waveguide, a first optical component, a second optical component, a first objective of a first optical sub-system and a second objective of a second optical sub-system. The input aperture is configured to allow or direct multispectral radiation from a scene into the optical waveguide.

The first optical component is configured to cause a first portion the multispectral radiation with wavelengths in a first range to exit the optical waveguide at a first position, and a second portion of the multispectral radiation with wavelengths in a second range to travel through the optical waveguide from the first position to a second position via total internal reflection. The first range typically does not overlap the second range.

The second optical component configured to cause the second portion of the multispectral radiation to exit the optical waveguide at the second position.

The first objective of the first optical sub-system is configured to receive the first portion of the multispectral radiation after exiting the optical waveguide at the first position, and the second objective of the second optical sub-system is configured to receive the second portion of the multispectral radiation after exiting the optical waveguide at the second position.

The system is configured to produce an image of the scene that includes a visual representation based on the first portion of the multispectral radiation, and a visual representation based on the second portion of the multispectral radiation. The visual representation based on the first portion of the multispectral radiation and the visual representation based on the second portion of the multispectral radiation overlap each other in the produced image.

In some implementations, one or more of the following advantages are present.

For example, improvements may be realized, for example, in weapon sights, particularly in weapon sights that are adapted to fuse images of a scene across different spectral bands into a composite image (e.g., one including visible and infrared or thermal images from the scene). More particularly, the undesirable effects associated with parallax can be eliminated.

A system can receive multispectral radiation from a scene, separate the multispectral radiation into different wavebands, and input the radiation from each respective waveband into an optical system or device that is specifically designed for that waveband. This can be done in a highly effective manner, with a highly compact form factor, having a low mass and occupying a small volume, which is particularly helpful for mobile technologies. Also, in certain implementations, because all of the functions are incorporated within a single element, their relative positions can be maintained very stably and robustly, which is important for devices that are subjected to harsh environmental requirements, particularly those involving shocks, vibrations and thermal changes.

Other features and advantages will be apparent from the description and drawings, and from the claims.

DETAILED DESCRIPTION

Figure 1:
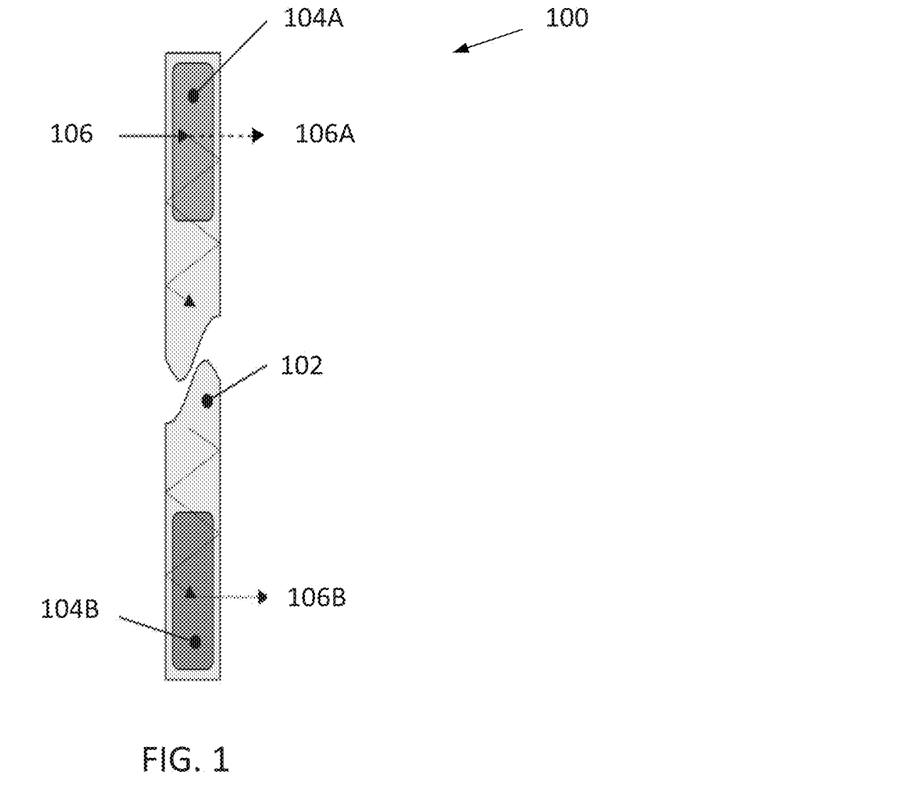
FIG. 1 is a schematic side view of an exemplary system for separating multispectral radiation into different components.

FIG. 1 shows an exemplary system for separating multispectral radiation into different components. The illustrated system 100 may be incorporated into a weapon sight, for example. More particularly, the illustrated system 100 may be incorporated into a weapon sight that is adapted to create a composite image of a scene that includes visual representations of different waveband components from the scene (e.g., a visible waveband component and a thermal waveband component). In a typical implementation, the illustrated system 100 is adapted to do so without unduly, or at all, suffering from undesirable effects associated with parallax, to which certain prior art technologies may be susceptible.

In general, the system 100 typically receives multispectral radiation from a scene, separates the multispectral radiation into different wavebands, and inputs the radiation from each respective waveband into an optical sub-system (e.g., device) that is specifically designed for that waveband. Moreover, in a typical implementation, the system 100 performs these functions with a highly compact form factor, having a low mass and occupying a small volume, which is particularly helpful in mobile applications, such as certain weapon sites, or head worn imaging technologies.

The system 100 has an optical waveguide 102, a first optical component 104a at a first position along the optical waveguide 102, and a second optical component 104b at a second position along the optical waveguide 102.

The optical waveguide 102 is configured to receive multispectral radiation 106 from a scene. This multispectral radiation is represented by the arrow 106 pointing into the optical waveguide 102 in the upper left corner of the optical waveguide 102. In a typical implementation, the multispectral radiation 106 enters the optical waveguide 102 after passing through an input aperture (not shown in FIG. 1), which, in a typical implementation, would be one and only one input aperture. The input aperture can be formed in a housing (also not shown in FIG. 1) that surrounds the optical waveguide 102 and the other components shown in FIG. 1. In a typical implementation, the input aperture would be configured to allow or direct the multispectral radiation from the scene into the optical waveguide 102 as represented by the arrow 106 shown in FIG. 1.

The multispectral radiation 106 can include any radiation and can span across either a wide or narrow extent of the electromagnetic spectrum. In a typical implementation, the multispectral radiation includes, at least, radiation that operates in or involves any two or more regions of the electromagnetic spectrum (e.g., the visible radiation region and the thermal infrared radiation region, or the visible radiation region and the reflected infrared radiation region, etc.). In a typical implementation, "reflected infrared" means near infrared (NIR, approximately 700 nm to 1 μm) and short wavelength infrared (SWIR, approximately 1 μm to 3 μm). Additionally, in a typical implementation, "thermal infrared" means mid-wavelength infrared (MWIR, approximately 3 μm to 5 μm) and long wavelength infrared (LWIR, approximately 7 μm to 14 μm). The distinction between "reflected" and "thermal" infrared can be indicate, for example, whether the incoming radiation is primarily reflected off the scene from a celestial source (sunlight or starlight), or whether the incoming radiation is primarily due to thermal emission from objects within the scene. In various implementations, of course, the different regions may be defined by ranges of wavelengths or frequencies, instead of by name.

The first optical component 104a, in the illustrated example, is generally configured to cause a first portion 106a of the multispectral radiation 106 with wavelengths in a first range to exit the optical waveguide at the first position. The first optical component 104a is further generally configured to cause a second portion 106b of the multispectral radiation 106 with wavelengths in a second range to traverse the optical waveguide 102 from the first position to the second position, at least in part, via total internal reflection. More particularly, the first optical component directs the second portion 106b of the multispectral radiation down the optical waveguide 102 at an angle that will result in the second portion 106b of the multispectral radiation totally internally reflecting in the optical waveguide until it reaches the second position.

Total internal reflection is a phenomenon that happens when a propagating wave (e.g., the second portion 106b of the multispectral radiation in FIG. 1) strikes a medium boundary (e.g., the outer surface of the optical waveguide 102 in FIG. 1) at an angle larger than a particular critical angle with respect to the normal to the boundary. If the refractive index is lower on the other side of the boundary (which, in most instances, would be air) and the incident angle is greater than the critical angle, the wave cannot pass through and is entirely reflected.

In a typical implementation, the first range of wavelengths is different than the second range of wavelengths. Moreover, in a typical implementation, the first range of wavelengths does not overlap, or at least not substantially, the second range of wavelengths.

In one exemplary implementation, the first portion 106a of the multispectral radiation 106, which exits the optical waveguide 102 at the first position, is thermal radiation (e.g., with wavelengths between about 7.5 micrometers and 14.5 micrometers), whereas the second portion 106b of the multispectral radiation 106, which the first optical component 104a directs toward the second position via total internal reflection inside the optical waveguide 102, is visible to near infrared radiation (e.g., with wavelengths between about 500 nanometers and 900 nanometers).

In one exemplary implementation, the first optical component 104a is a diffraction grating and is positioned at a surface of the optical waveguide 102 opposite the surface where the multispectral radiation 106 entered the optical waveguide 102. In that example, the multispectral radiation 106 enters the optical waveguide 102 at a surface on the left side of the optical waveguide 102 (as shown in FIG. 1) and travels through the optical waveguide 102 until it reaches the diffraction grating.

In general, a diffraction grating is an optical component that divides (disperses) multispectral radiation into light components by wavelength. One type of diffraction grating is one with a large number of evenly spaced parallel slits, although other types of diffraction gratings are available as well. The diffraction grating in this example would allow the first portion 106a of the multispectral radiation 106 to pass though it and would direct the second portion 106b of the multispectral radiation back into the optical waveguide 102 at an angle that will result in the second portion 106b being able to totally internally reflect at the boundaries of the optical waveguide 102 as it moves toward the second position (i.e., toward the second optical component 104b).

The second optical component 104b is generally configured to cause the second portion 106b of the multispectral radiation 106 to exit the optical waveguide 102 at the second position. In the illustrated example, the first position (near the first optical component 104a) is near the top of the optical waveguide 102 and the second position (near the second optical component 104b) is near the bottom of the optical waveguide 102. However, in various implementations, the first position and the second position, relative to each other and relative to the optical waveguide 102 can vary.

Again, in an exemplary implementation, the second portion 106b of the multispectral radiation is visible to near infrared.

In one exemplary implementation, the second optical component 104b is an angled mirror and is inside the optical waveguide 102. In general, a mirror is an optical component that reflects radiation in such a way that, for incident radiation in some range of wavelengths, the reflected radiation preserves many or most of the detailed physical characteristics of the original radiation. In this example, the angled mirror would be configured to reflect the second portion 106b of the multispectral radiation (e.g., with wavelengths between 500 nanometers and 900 nanometers) out of the optical waveguide 102 at the second position.

The system 100 and its sub-components (e.g., the optical waveguide 102, the first optical component 104a and the second optical component 104b) can have a variety of possible configurations, as long as the system 100 and its respective sub-components are able to perform the functionalities disclosed herein.

The optical waveguide 102, for example, can be virtually any kind of optical waveguide, as long as it is able to perform the functionalities attributed to the optical waveguide 102 described herein. These functionalities can include, for example, being able to receive the multispectral radiation 106 and carrying at least the second portion 106b of the multispectral radiation (e.g., visible to near infrared radiation) along the optical waveguide 102 via total internal reflection.

The specific dimensions of the optical waveguide 102 can vary depending on the overall system design, desired functionalities, etc. In some implementations, for example, the optical waveguide is approximately 40 millimeters wide (i.e., the dimension in the direction into and out of the plane of the paper). This dimension can, of course, vary and can range, for example, from 10 millimeters to 70 millimeters, 20 millimeters to 60 millimeters, or 30 millimeters to 50 millimeters, etc. in various implementations.

In some implementations, the optical waveguide 102 is about 2 millimeters thick (i.e., from the front surface of the optical waveguide 102 (where the multispectral radiation 106 enters the optical waveguide) to the back surface of the optical waveguide (where the first portion 106a and the second portion 106b of the multispectral radiation exit the optical waveguide)). This dimension can, of course, vary and can range, for example, from 1 millimeter to 10 millimeters. Generally speaking, if the optical waveguide 102 is much thicker than 10 millimeters, then the size and weight advantages may be negated, and if the optical waveguide 102 is much thinner than 1 millimeter and the stability and robustness benefits may be lost.

The optical waveguide 102 also can vary in length. In various implementations, for example, the optical waveguide 102 can be between about 50 millimeters and 150 millimeters long. Other lengths are, of course, possible as well.

The optical waveguide 102 can be made of various different materials. In various implementations, for example, the optical waveguide can be made of or can include glass, polymer and/or semiconductor material. In one exemplary implementation, the optical waveguide is made of multispectral zinc sulphide.

The first optical component 104a can be virtually any kind of optical component that is able to perform the associated functionalities attributed to the first optical component described herein. These functionalities can include, for example, separating multispectral radiation into different wavebands and directing the separated radiation into different directions, respectively. In various implementations, the first optical component can be or include a diffraction grating, a prism, a mirrored surface, a beam splitter and/or a hologram. Other components are possible as well.

Likewise, the second optical component 104b can be virtually any kind of optical component able to perform the associated functionalities described herein. These functionalities can include, for example, separating multispectral radiation into different wavebands and directing the separated radiation into different directions, respectively. In various implementations, the second optical component can be or include a diffraction grating, a prism, a mirrored surface, a beam splitter and/or a hologram. Other components are possible as well.

The first optical component 104a may be, but need not be, the same type of optical component as the second optical component 104b. For example, in one implementation, the first and second optical components 104a, 104b are both diffraction gratings. In another exemplary implementation, the first optical component 104a is a diffraction grating and the second optical component 104b is an angled mirror. Other configurations are possible as well.

If the first optical component 104a is the same type of optical component as the second optical component 104b, the first optical component 104a will usually have a different configuration (e.g., overall size, and dimensions) than the second optical component 104b. For example, in one implementation, the first optical component 104a and the second optical component 104b are substantially circular diffraction gratings, the diameter of one being about 40 millimeters and the diameter of the other being about 35 millimeters. Of course, the line spacing, and other dimensional variables, can vary as well.

The first optical component 104a and the second optical component 104b can be right next to each other, even touching each other, or can be virtually any distance apart from one another. In various implementations, for example, the distance from the center of the first optical component 104a to the center of the second optical component 104b can be between 30 millimeters and 100 millimeters. Other distances are possible as well.

Typically, the first optical component 104a and the second optical component 104b are arranged relative to each other such that, as shown in FIG. 1, the first portion 106a of the multispectral radiation and the second portion 106b of the multispectral radiation exit the optical waveguide 102 substantially in parallel. Moreover, in the illustrated example, the first optical component 104a and the second optical component 104b are aligned with each other within the optical waveguide and substantially parallel to each other. This, however, is not a requirement.

In a typical implementation, the system 100 in FIG. 1 would include a first objective (e.g., lens) for a first optical sub-system (not shown) and a second objective (e.g., lens) for a second optical sub-system (also not shown). In such an implementation, the first objective would be configured to receive the first portion 106a of the multispectral radiation after exiting the optical waveguide 102 at the first position. In a typical implementation, this means that the first objective would be physically located adjacent to the optical waveguide 102 near the first position (i.e., near the first optical component 104a).

Moreover, in such an implementation, the second objective would be configured to receive the second portion 106b of the multispectral radiation after exiting the optical waveguide at the second position. In a typical implementation, this means that the second objective would be physically located adjacent to the optical waveguide 102 near the second position (i.e., near the second optical component 104a). However, proximity between the objectives and the optical waveguide is not necessarily required.

The first and second optical sub-systems can be virtually any kind of sub-systems. However, generally speaking, the first optical sub-system is configured to process (e.g., with a computer-based processor) the first portion 106a of the multispectral radiation, and the second optical sub-system is configured to process (e.g., with a computer-based processor) the second portion 106b of the multispectral radiation. In some implementations, the processing is done by one computer-based processor. In some implementations, the processing is done by two or more computer-based processors.

In some implementations, the first and second optical sub-systems work together (or output respective information that is used) to produce a composite image (or sequence of images, e.g., a video) of a scene using information related to the first portion 106a of the multispectral radiation and information related to the second portion 106b of the multispectral radiation. So, in one exemplary implementation, where the first portion 106a of the multispectral radiation is infrared radiation and the second portion 106b of the multispectral radiation is visible radiation, a composite image of a scene may be produced superimposing information about the infrared radiation from the scene onto a visible representation of the scene.

In a typical implementation, therefore, the system 100 may be adapted to produce a composite image (e.g., a collection of composite images, in video format) having a visual representation of the first portion 106a of the multispectral radiation and a visual representation of the second portion 106b of the multispectral radiation. The visual representation of the first portion 106a of the multispectral radiation and the visual representation of the second portion 106b of the multispectral radiation can overlap each other in the produced image. Moreover, the overlapping is highly accurate and substantially, if not entirely, unaffected by parallax problems.

Figure 2:
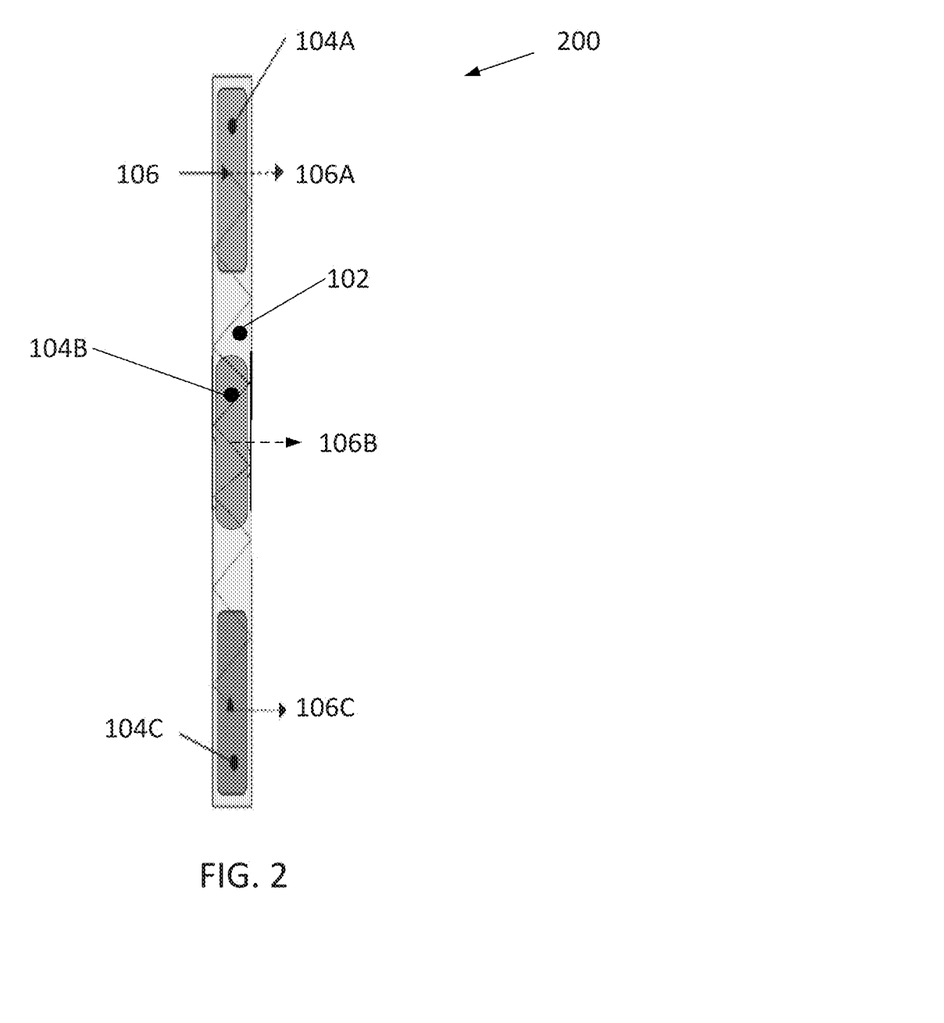
FIG. 2 is a schematic side view of another exemplary system for separating multispectral radiation into different components.

The system 200 in FIG. 2 is similar in many ways to the system 100 in FIG. 1.

The most notable difference between the system 200 in FIG. 2 and the system 100 in FIG. 1 is that the system 200 has three optical components 104a, 104b and 104c, instead of just two. As such, the system 200 in FIG. 2 is configured to output three component portions 106a, 106b and 106c of the multispectral radiation, instead of just two.

In the system 200 of FIG. 2, the first optical component 104a is configured to cause a first portion 106a of the multispectral radiation 106 with wavelengths in a first range to exit the optical waveguide at the first position. The first optical component 104a is further configured to cause a second portion 106b and a third portion 106c of the multispectral radiation 106 with wavelengths in a second range and third range, respectively, to traverse the optical waveguide 102 from the first position toward the second and third positions, at least in part, via total internal reflection.

Moreover, the second optical component 104b is not only configured to cause a second portion 106b of the multispectral radiation to exit the optical waveguide 102 at a second position along the optical waveguide 102, but it is also configured to cause a third portion 106c of the multispectral radiation (with wavelengths in a third range) to travel through the optical waveguide 102 from the second position to a third position, at least in part, via total internal reflection.

The third optical component 104c in the illustrated implementation is configured to cause the third portion 106c of the multispectral radiation to exit the optical waveguide 102 at the third position. Typically, the third portion 106c of the multispectral radiation would be different than, and typically not overlapping, any of the first or second portions 106a, 106b of the multispectral radiation.

Like the first and second optical components, the third optical component 104c can be virtually any kind of optical component that is able to perform the functionalities described herein and attributed to the third optical component. For example, in various implementations, the third optical component 104c can be or include a diffraction grating, a prism, a mirrored surface, a beam splitter and/or a hologram. Other components are possible as well.

Although not shown in FIG. 2, in a typical implementation, the system 200 would also include a third objective (e.g., lens) for a third optical sub-system. The third objective would be configured to receive the third portion 106c of the multispectral radiation after exiting the optical waveguide 102 at the third position. The third optical sub-system would be configured to process the third portion of the multispectral radiation.

In a typical implementation, the system 200 in FIG. 2 can be configured to be used to produce a composite image that is based on information relating to the first portion 106a of the multispectral radiation, information relating to the second portion 106b of the multispectral and information relating to the third portion 106c of the multispectral radiation.

Of course, in various implementations, the systems described herein could include any number of optical components (e.g., two as in FIG. 1, three as in FIG. 2, four, five, six, etc. etc.).

Figure 3:
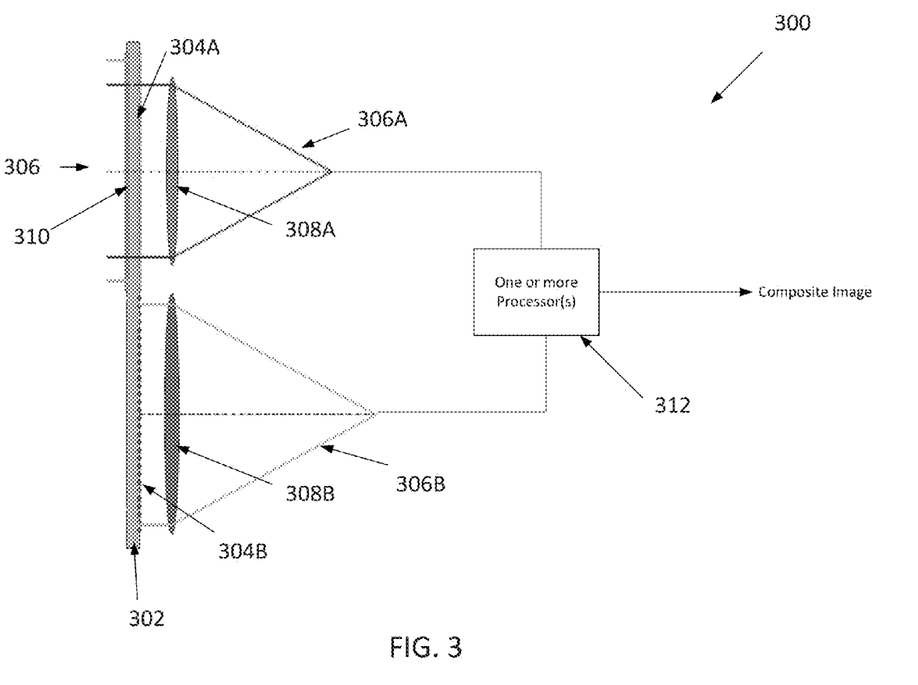
FIG. 3 is a schematic side view of yet another exemplary system for separating multispectral radiation into different components and one or more computer processors to process data associated with the separated components.

FIG. 3 is a more detailed, exemplary implementation of the system in FIG. 1.

The illustrated exemplary implementation includes an optical waveguide 302 configured to receive multispectral radiation 306 from a scene, a first optical component 304a, a second optical component 304b, a first objective 308a, and a second objective 308b.

The optical waveguide 302 in the illustrated example is a 2 millimeter thick waveguide made from multispectral zinc sulphide and is positioned in front of the two objectives 308a, 308b (e.g., lens/apertures). The input aperture 310 for the waveguide is coated with a dual-waveband, anti-reflection coating, operating in the visible to near infrared and thermal wavebands.

On the back surface of the waveguide, directly behind the input aperture 310, is the first optical component 304a, which, in the illustrated example, is a diffraction grating. The diffraction grating has a spacing of 2030 lines per millimeter. This grating reflects the visible to near radiation into the −1 reflection order with a peak efficiency of about 41%. In general, the −1 reflection order is the first diffraction order for a reflective grating for which the reflected angle is greater than the angle of specular reflection (which is the zeroth reflection order). In some implementations, a long wave pass coating is applied to this surface to improve the reflected efficiency. The grating has substantially no effect on wavelengths in the thermal waveband (306A). These wavelengths are transmitted through to the thermal objective 308a.

The −1 reflection order from the grating 304a reflects at an angle such that the reflected radiation (306B) exceeds the critical angle (for total internal reflection to occur) within the waveguide 302. As a result, the visible to near infrared radiation (306B) is transmitted along the waveguide 302 until it reaches the surface in front of the visible to near infrared objective 308b. Here, the second optical element 304b, another diffraction grating, this time operating in transmission, diffracts the visible to near infrared radiation out of the waveguide 302, and into the visible to near infrared objective 308b. In some implementations, the transmitted efficiency is improved with a visible to near infrared anti-reflection coating.

In some implementations, it is possible for the same grating, and indeed the same coating, to be used over the whole of the second surface of the waveguide 302, especially if this is beneficial to manufacturing.

In the illustrated example, the thermal objective 308a images wavelengths from 7.5 micrometers to 14.5 micrometers, and the visible to near-infrared objective 308b images wavelengths from 500 nanometers to 900 nanometers. The thermal objective 308a has an optical aperture of 25.4 millimeters diameter and the visible to near infrared objective 308b has an optical aperture of 35 millimeters diameter. The optical axes of the two objectives 308a, 308b are parallel and separated by 40 millimeters.

As represented schematically in FIG. 3, one or more computer-based processors 312 (e.g., the processor in a first sub-system and the processor in a second sub-system) can be provided to generate a composite image of a scene using information from the thermal objective 308a and the visible to near infrared objective 308b. In a typical implementation, in the composite image, the optical apertures of the thermal objective and vis-NIR objective can be effectively overlaid, thereby eliminating any parallax errors.

A number of embodiments of the invention have been described. Nevertheless, it will be understood that various modifications may be made without departing from the spirit and scope of the invention.

For example, the number and specific arrangement of optical components relative to the optical waveguide can vary considerably. Moreover, the specific functionalities of each optical component in a particular system can vary. For example, in some implementations, the first optical component is centrally located relative to the optical waveguide and may be adapted to direct two different portions of the incident multi spectral radiation in different directions through the optical waveguide. In those implementations, there may be one or more other optical components above and/or one or more other optical components below the first optical component.

In a typical implementation, the multi spectral radiation enters the optical waveguide at a first surface. As shown in the FIG. 1, for example, all of the optical components can be configured so that the respective portions of the multispectral radiation exit the optical waveguide through a surface opposite the first surface. Alternatively, one or more (or all) of the other optical components can be configured so that respective portions of the multispectral radiation exit the optical waveguide through either the first surface or some other surface besides the surface opposite the first surface. In fact, in some implementations, one or more of the optical components can be configured to exit the optical waveguide through its top or bottom surfaces.

Additionally, in some implementations, the system includes an initial optical component (e.g., a mirror) that substantially only directs the multispectral radiation into the waveguide and substantially prevents any portions of the multispectral radiation from exiting the waveguide.

Depending on its particular configuration and desired functionality, each optical component can be arranged either inside or at one of the outer surfaces of the optical waveguide.

In some implementations, multiple waveguides, each having a plurality of optical components, can be combined to operate together. Likewise, in some implementations, the systems described herein can be used in conjunction with other components (e.g., mirrors and other optical components) that are outside and/or away from the optical waveguide.

The specific dimensions and relative sizes of the various components and parts disclosed herein can vary. Moreover, a variety of materials may be used to implement the concepts disclosed herein.

In some implementations, the systems described herein may be used recursively, in that the radiation from a waveguide output component could be used as the input to a subsequent waveguide. This could allow the subsequent waveguide to be better optimised for the reduced waveband. Alternatively, instead of outputting the radiation from the waveguide, a waveband selective component could be used to change the direction of propagation of a portion of the transmitted radiation within the waveguide, allowing the waveguide structure to branch in two dimensions.

The system can be designed to separate multispectral radiation into any two or more different wavebands in the electromagnetic spectrum.

In some implementations, the system could be used in reverse, to combine a number of projected beams of different wavebands so that they are emitted from a common aperture with substantially no bore-sight errors. Such a configuration could be used in a laser pointer/illuminator module. This concept can be extended in that the waveguide could be used to transmit the projected radiation from an aperture which lies on the optical axis of the sight to which the laser pointer/illuminator module is bore-sighted. This can help ensure that substantially no bore-sight error is present in any of the projected beams at any range.

As the waveguide operates, in some respects, via total internal reflection, careful choice of the waveguide material can ensure that the only substantial obscuration to the optical aperture of the sight is the output component.

The optical sub-systems can be entirely separate systems or can be integrated together as one.

It should be understood that relative terminology used herein, such as "upper", "lower", "above", "below", "front", "rear," etc. is solely for the purposes of clarity and is not intended to limit the scope of what is described here to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely (e.g., for a measurable quantity this might mean 99% or more, 95% or more, 90% or more, 85% or more). For non-measurable quantities (e.g., a surface that is substantially parallel to another surface), substantial should be understood to mean completely or almost completely (e.g., deviating from parallel no more than a few (e.g., less than 3, 4 or 5) degrees.

Finally, the term multispectral is used throughout this document. This term should be construed broadly to describe anything operating in or involving two or more regions of the electromagnetic spectrum. So, for example, the phrase multispectral radiation should be construed broadly to include radiation that operates in or involves two or more regions of the electromagnetic spectrum (e.g., the visible radiation region and the infrared radiation region).

Other implementations are within the scope of the claims.

What is claimed is:

1. A system comprising:
an optical waveguide configured to receive multispectral radiation from a scene;
a first optical component configured to cause:
a first portion of the multispectral radiation with wavelengths in a first range to exit the optical waveguide at a first position; and
a second portion of the multispectral radiation with wavelengths in a second range to travel through the optical waveguide from the first position to a second position via total internal reflection;
a second optical component configured to cause the second portion of the multispectral radiation to exit the optical waveguide at the second position; and
a first objective for a first optical sub-system, wherein the first objective is configured to receive the first portion of the multispectral radiation after exiting the optical waveguide at the first position;
a second objective for a second optical sub-system, wherein the second objective is configured to receive the second portion of the multispectral radiation after exiting the optical waveguide at the second position;
the first optical sub-system is configured to process the first portion of the multispectral radiation, and
the second optical sub-system is configured to process the second portion of the multispectral radiation; and
wherein the system is configured to produce an image of the scene that comprises:
a visual representation of the first portion of the multispectral radiation; and
a visual representation of the second portion of the multispectral radiation, wherein the visual representation of the first portion of the multispectral radiation and the visual representation of the second portion of the multispectral radiation overlap each other in the produced image.

2. The system of claim 1, wherein the second range does not overlap the first range.

3. The system of claim 1, wherein each respective one of the first optical component and the second optical component is an optical component selected from the group consisting of: a diffraction grating, a refractive element, a prism, a mirrored surface, a beam splitter and a hologram.

4. The system of claim 3, wherein the first optical component is different than the second optical component.

5. The system of claim 1, further comprising:
a third optical component,
wherein the second optical component is further configured to cause a third portion of the multispectral radiation with wavelengths in a third range to travel through the optical waveguide from the second position to a third position via total internal reflection, and
wherein the third optical component is configured to cause the third portion of the multispectral radiation to exit the optical waveguide at the third position.

6. The system of claim 1, further comprising:
a third objective for a third optical sub-system, wherein the third objective is configured to receive the third portion of the multispectral radiation after exiting the optical waveguide at the third position,
wherein the third optical sub-system is configured to process the third portion of the multispectral radiation.

7. The system of claim 1, wherein:
the first range includes wavelengths between 7.5 µm and 14.5 µm, and
the second range includes wavelengths between 500 nm and 900 nm.

8. The system of claim 1, further comprising one and only one input aperture configured to allow or direct the multispectral radiation from the scene into the optical waveguide.

9. The system of claim 1, further comprising:
an initial optical component that directs substantially all of the multispectral radiation received at the optical waveguide to travel through the optical waveguide from the initial optical component to the first optical component via total internal reflection.

10. A system comprising:
an optical waveguide;
one and only one input aperture configured to allow or direct multispectral radiation from a scene into the optical waveguide;
a first optical component configured to cause:
a first portion the multispectral radiation with wavelengths in a first range to exit the optical waveguide at a first position; and
a second portion of the multispectral radiation with wavelengths in a second range to travel through the optical waveguide from the first position to a second position via total internal reflection,
wherein the first range does not overlap the second range;
a second optical component configured to cause the second portion of the multispectral radiation to exit the optical waveguide at the second position;
a first objective of a first optical sub-system, the first objective being configured to receive the first portion of the multispectral radiation after exiting the optical waveguide at the first position;
a second objective of a second optical sub-system, the second objective being configured to receive the second portion of the multispectral radiation after exiting the optical waveguide at the second position,
wherein the system is configured to produce an image of the scene that comprises:
a visual representation based on the first portion of the multispectral radiation; and
a visual representation based on the second portion of the multispectral radiation,
wherein the visual representation based on the first portion of the multispectral radiation and the visual representation based on the second portion of the multispectral radiation overlap each other in the produced image.

11. The system of claim 10, wherein each respective one of the first optical component and the second optical component is an optical component selected from the group consisting of: a diffraction grating, a refractive element, a prism, a mirrored surface, a beam splitter and a hologram.

12. The system of claim 11, wherein the first optical component is a different type of optical component than the second optical component.

13. The system of claim 10, further comprising:
a third optical component,
wherein the second optical component is further configured to cause a third portion of the multispectral radiation with wavelengths in a third range to travel through the optical waveguide from the second position to a third position via total internal reflection, and wherein the third optical component is configured to cause the third portion of the multispectral radiation to exit the optical waveguide at the third position; and a third objective for a third optical sub-system, wherein the third objective is configured to receive the third portion of the multispectral radiation after exiting the optical waveguide at the third position, and wherein the third optical sub-system is configured to process the third portion of multispectral radiation.

14. A method comprising:

allowing passage of multispectral radiation from a scene into an optical waveguide;

causing, with a first optical component, a first portion the multispectral radiation with wavelengths in a first range to exit the optical waveguide at a first position;

causing, with the first optical component, a second portion of the multispectral radiation with wavelengths in a second range to travel through the optical waveguide from the first position to a second position via total internal reflection; and causing, with a second optical component, the second portion of the multispectral radiation to exit the optical waveguide at the second position, wherein each respective one of the first optical component and the second optical component is an optical component selected from the group consisting of: a diffraction grating, a refractive element, a prism, a mirrored surface a beam litter and a hologram.

15. The method of claim 14, wherein the first range does not overlap the second range.

16. The method of claim 14, further comprising:

receiving, at a first objective of a first optical sub-system, the first portion of the multispectral radiation after exiting the optical waveguide at the first position; and receiving, at a second objective of a second optical sub-system, the second portion of the multispectral radiation after exiting the optical waveguide at the second position.

17. The method of claim 14, further comprising:

producing an image of the scene, wherein the image comprises:

a visual representation based on the first portion of the multispectral radiation; and a visual representation based on the second portion of the multispectral radiation, wherein the visual representation based on the first portion of the multispectral radiation and the visual representation based on the second portion of the multispectral radiation overlap each other in the produced image.

18. The method of claim 14, wherein the first optical component is a different type of optical component than the second optical component.

19. The method of claim 14, further comprising:

causing, with the second optical component, a third portion of the multispectral radiation with wavelengths in a third range to travel through the optical waveguide from the second position to a third position via total internal reflection; and causing, with a third optical component, the third portion of the multispectral radiation to exit the optical waveguide at the third position.

20. A method comprising:

receiving, at a first position in an optical waveguide, a first portion of radiation having wavelengths in a first range;

causing, with a first optical component, the first portion of radiation to travel through the optical waveguide via total internal reflection;

receiving, at a second position in the optical waveguide, a second portion of radiation having wavelengths in a second range that is different than the first range;

causing, with a second optical component, the second portion of radiation to travel through the optical waveguide via total internal reflection; and causing, with a third optical component, the first portion of radiation and the second portion of radiation to exit the optical waveguide together and pass through a single common aperture, wherein each respective one of the first optical component and the second optical component is an optical component selected from the group consisting of: a diffraction grating, a refractive element, a prism, a mirrored surface, a beam splitter and a hologram.

* * * * *